Nov. 10, 1931.  I. GROMETSTEIN  1,831,384
COFFEE PERCOLATOR
Filed Oct. 12, 1929
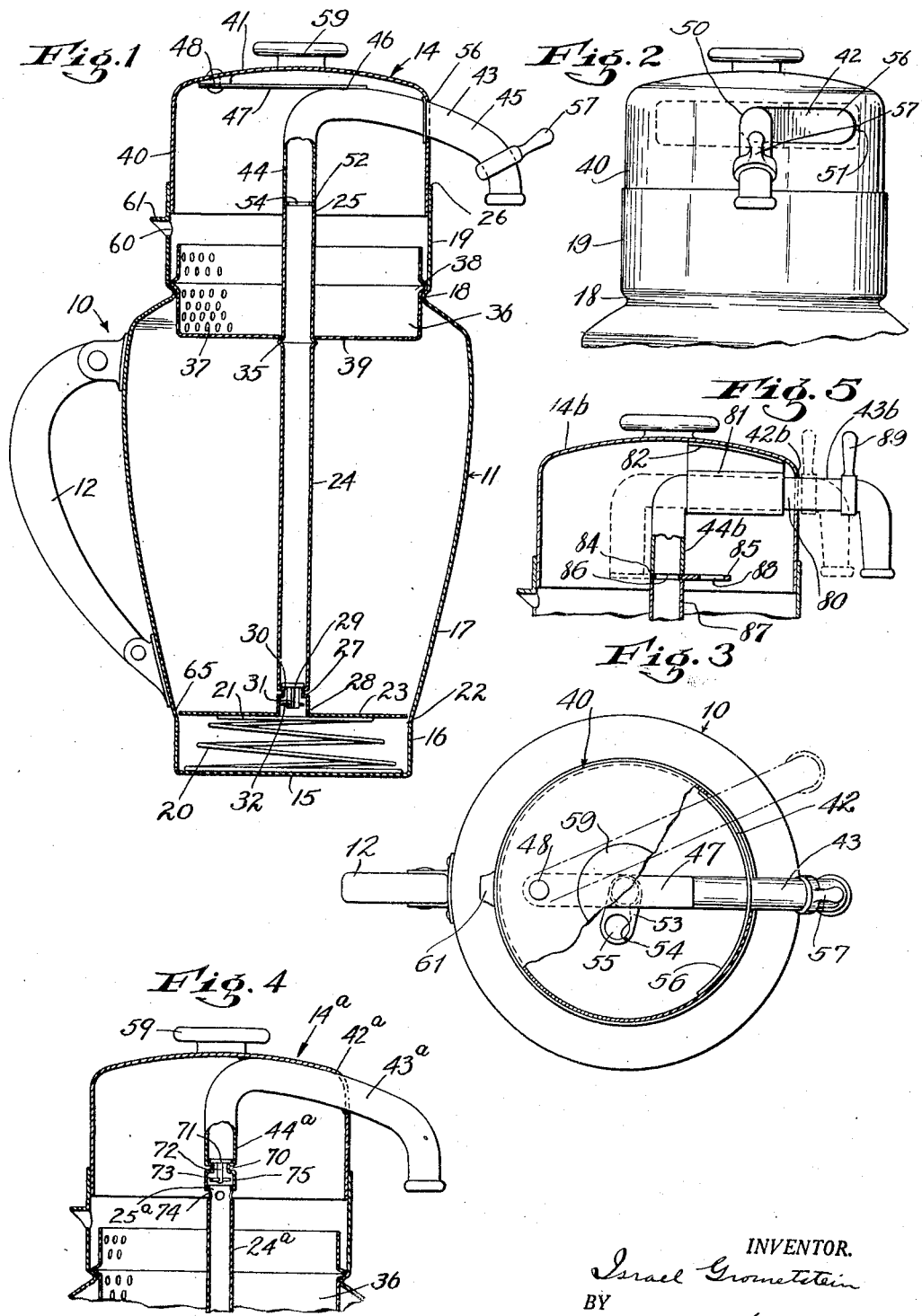
INVENTOR.
Israel Grometstein
BY
ATTORNEYS.

Patented Nov. 10, 1931

1,831,384

UNITED STATES PATENT OFFICE

ISRAEL GROMETSTEIN, OF BRONX, NEW YORK

COFFEE PERCOLATOR

Application filed October 12, 1929. Serial No. 399,172.

This invention relates to coffee percolators.

An object of this invention is to provide a percolator of the character described having means for dispensing or pouring the percolated coffee by a pumplike action, thus obviating the necessity for lifting and tilting the coffee pot or manipulating valves such as stop cocks as is usually done with coffee percolators now in use, and hence preventing spillage and difficulty in handling said percolators.

A further object of this invention is to provide a neat, compact and rugged device of the character described which shall be comparatively inexpensive to manufacture, smooth in operation, easy to manipulate, and withal practical and efficient to a high degree in use.

Other objects of this invention will in part be obvious and in part thereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is an elevational axial cross-sectional view of a coffee percolator embodying the invention;

Fig. 2 is a fragmentary, elevational side view of the percolator;

Fig. 3 is a top plan view of the percolator with parts broken away to show the interior construction;

Fig. 4 is a fragmentary, axial, cross-sectional view of the percolator, illustrating a modified, construction thereof; and Fig. 5 is a fragmentary, cross-sectional, view of the percolator, illustrating a still further modified construction.

Referring now in detail to the drawings, 10 designates a coffee percolator embodying the invention and comprises generally a receptacle or a pot 11 having a handle 12 and cover 14. The pot 11 preferably comprises a bottom wall 15 and a cylindrical upstanding wall portion 16 extending from said bottom wall. Extending from said cylindrical wall portion 16 is an outwardly flaring or tapering wall 17 constricted adjacent the upper end thereof as at 18 to form a shoulder, and terminating in an upright cylindrical neck portion 19. Mounted within the body 11 and supported on the bottom wall 15 thereof, is a coil compression spring 20 of any suitable construction, the normal level of the uppermost convolution 21 thereof being somewhat above the point 22 where said cylindrical wall 16 joins the tapering wall 17. Supported on said spring 21 is an annular disc or piston-like plate 23 having an outer diameter substantially equal to the inner diameter of said cylindrical wall 16 and forming a snug sliding fit with said cylindrical wall. Extending upwardly from said disc 23 and formed integral therewith is an axial tube 24 terminating as at 25 adjacent the upper end 26 of said neck portion 19, for the purpose hereinafter appearing. The tube 24 may be provided with an inwardly extending annular shoulder 27 adjacent the lower end 28 thereof. Mounted on said shoulder 27 is a valve 29 having a head 30 contacting the upper side of said shoulder, a stem 31 extending downwardly from said head, and a pair of oppositely extending pins 32 of sufficient length to engage the underside of said shoulder 27 to provide stop means for limiting the upward movement of said valve. The tube 24 may furthermore be provided with an integrally formed shoulder or collar 35 at a point somewhat below the shoulder 18, for the purpose hereinafter appearing.

Mounted within the neck portion of the pot is a receptacle 36 formed with a plurality of small perforations 37 and adapted to receive the fresh ground coffee. Said receptacle 36 is provided with an outwardly extending shoulder 38 adapted to engage and rest on said shoulder 18. The bottom wall 39 of said receptacle 36 preferably contacts the said shoulder 35 thus aiding in retaining the tube 24 and disc 23 against upward movement within the pot.

The cover 14 is preferably provided with a cylindrical side wall 40, adapted to slidably engage within the neck portion 19 of said pot 11, and with a top wall 41 of any suitable shape. Said side wall 40 may be formed with a peripheral slot or opening 42 and extending through said slot is a spout member 43. Said spout preferably comprises a vertical tube portion 44 and a downwardly curved portion 45. Attached to said spout 43 as at 46 is a rod 47 aligned with said spout and pivoted as at 48 to the inside of the top wall 41 of said cover at a point adjacent the side wall 40 thereof.

As illustrated in Figs. 1 and 2, the tubular portions 44 of said spout 43 are adapted for vertical alignment with the tube 24 to permit liquid to pass upwardly through said tube and out through said spout. The spout 43, however, may be moved about the pivot 48 to the position shown in dotted lines in Fig. 3 of the drawings, and in this position the tubular portion 44, being disaligned with the tube 24, liquid is prevented from passing to the spout. The slot 42 is preferably of such angle as to provide curved side edge portions 50 and 51 to limit the angular movement of the spout. Attached to the lower edge 52 of said tubular portion 44 and interposed between said portion and the upper edge 25 of the tube 24 is a horizontally disposed plate 53 having an annular opening 54 at one end thereof aligned with the opening in said tube when the spout is in the position shown in full lines in Fig. 3. At the opposite end thereof said plate 53 is formed with an annular opening 55 adapted for alignment with the tube 24 when said spout is moved to the dotted line position shown in Fig. 3. Thus, when the spout 43 is moved to said dotted line position for disaligning the tube portion 44 from the tube 24, the liquid from said latter tube may pass thru the upper end thereof and opening 55 into receptacle 36. The plate 53 serves to aid in supporting the spout and cover 14 when said spout is moved to said dotted line position.

Attached to the portion 45 of said spout 43 is a curved plate 56 adapted to contact the inner surface of said cover wall portion 40 adjacent the slot 42. The length of said plate 56 is preferably such that the opening 42 may be covered in all angular positions of the spout 43. A handle member 57 made of any suitable heat insulating material may be attached to the spout 43 adjacent the outer end thereof to permit manipulation of the spout without danger of burning the hands. Attached to the top of the cover 14 in any suitable manner is a button 59, likewise made of heat insulated material for the purpose hereinafter appearing. The neck portion 19 of the pot may be formed with an opening 60 to permit steam to escape from said pot, a small curved portion 61 extending outwardly from said neck and disposed over said opening 60 serving to guide the steam outwardly in a horizontal direction.

The operation of the device will now be described. For percolating coffee, the freshly ground coffee is placed in the perforated receptacle 36 and the water is poured into the pot 11. Upon heating the pot by use of gas or any suitable electric heating means (not shown), the heated liquid will pass upwardly through the tube 24, the valve 29 (when employed) being very light and easily lifted, thus permitting the heated water and generated steam to pass upwardly through said tube. When the coffee pot is being percolated, the spout 43 is in the dotted line position shown in Fig. 3, thus preventing liquid from passing out from said spout and permitting the liquid to flow from the tube 24 into the coffee container 36. During the percolation of the coffee, furthermore, it will be noted that liquid may pass through the space 65 between the disc 23 and the adjacent portion of the pot to permit an efficient circulation of liquid. When it is desired to dispense liquid, it is merely necessary to move the spout 43 to the full line position shown in Fig. 3 for aligning the tubular portion 44 with the tube 24. The cover may then be moved downwardly by pressing on the button 59, thus causing the tubular portion 44 to press downwardly on the tube, 24, said latter tube acting as a piston rod for moving the piston like disc 23 downwardly against the pressure of the spring 20. Upon movement of the disc 23 below the point 22, the escape of liquid within the cylindrical portion 16 is cut off except into the tube 24, the liquid thus being forced upwardly through said tube and out through the spout 43. Obviously, upon release of pressure from the cover 59 the spring 20 will move the disc 23, tube 24, spout 43, and cover 14 back to normal position. Thus the coffee may be poured or pumped into a cup or the like by simply pressing down on the cover.

It will now be obvious that the coffee pot need not be lifted and tilted, nor is it necessary to operate valves such as stop cocks, in the usual manner for pouring coffee, thus preventing spillage and difficulty in handling.

In accordance with the modified construction shown in Fig. 4, the spout 43a extends through a substantially circular opening 42a in said cover 14a and is rigidly fixed to said cover. Said spout is provided with a vertical tubular portion 44a aligned with the tube 24a and telescoping with the upper end 25a thereof. Said tubular portion 44a may furthermore be provided with an inwardly extending annular shoulder 70 and received on said shoulder is a valve 71 adapted to normally prevent passage of liquid through the spout. Said valve may be provided with a downwardly extending stem 72 and oppositely extending pins 73 adapted to engage said shoulder 70 and limit the upward movement of said valve. Adjacent the upper end portion 25a thereof, said tubular member 24 is provided with a plurality of openings 74 to normally permit the heated liquid rising into tube 24 to pass through said openings and into the receptacle 36. For dispensing liquid, it is merely necessary to press downwardly on the button 59, the pump-like action of the tube 24a and its attached disc causing the coffee to automatically open the valve 71 and pass outwardly through the spout 43a. It will be noted that during this operation the lower end 75 of the tubular portion 44a automatically covers the openings 74 in said tube 24a thus preventing passage of liquid through said openings until the cover is again released and the spring 20 moves said cover with its attached spout upwardly back to the position shown in Fig. 4 for uncovering said openings. It will be noted that with this modified construction movement of the spout is obviated.

In accordance with the modified construction shown in Fig. 5, the spout 43b extends through a circular opening 42b and the cover member 14b. Said spout 43b is provided with a straight intermediate horizontal portion 80 extending into said cover and slidably received within a sleeve 81 fixed to the inner surface of the cover 14b in any suitable manner as shown at 82. Said spout is furthermore provided with a downwardly extending tubular portion 44b extending from said horizontal portion 80. Attached to the lower edge 84 of said portion 44b is a horizontal plate 85 having an opening 86 adapted to register with the central tube 87. Said plate 85 is furthermore provided with an opening 88 adapted to overlie said tube 87 and support the cover 14b when said spout is moved to the dotted line position shown in Fig. 5. It will now be understood that when the spout is in the full line position shown in Fig. 5, the cover may be depressed to force the liquid upwardly through the central tube 87 and into said spout in the manner described above for the modification shown in Figs. 1 to 4 inclusive. To permit percolation of the coffee, however, the spout may be moved, by actuating the handle member 89, to the dotted line position of Fig. 5. In this position, the opening 88 will register with the upper end of the tube 87, the rising heated liquid and the steam coming from said tube thus being permitted to pass through said opening 88 and into the receptacle 36 for percolating the coffee.

The valve 29 mounted at the lower end of the central tube 24 serves to retain a quantity of liquid within the tube 24. Thus upon compressing the cover 14, this liquid within said tube will be forced out through the spout 45. However, should the tube 24 be made of relatively small diameter or the cylindrical chamber beneath the piston 23 relatively large, the use of said valve 29 may not be necessary and in fact a freer circulation of the liquid within said pot permitted, when said valve is not used.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. In a coffee percolator of the character described, in combination, a receptacle having a spout and adapted to contain liquid, manually actuated means mounted within said receptacle for forcing liquid through said spout, and means forming part of said last means for percolating coffee, mounted within said receptacle.

2. A coffee percolator comprising a liquid container, a receptacle for carrying ground coffee, mounted within said container, a vertical tubular member within said container normally communicating with said receptacle, a spout on said container, and means for simultaneously cutting off communication between said tubular member and said receptacle and establishing communication between said tubular member and said spout.

3. A coffee percolator comprising a liquid container, a receptacle for carrying ground coffee, mounted within said container, a vertical tubular member within said container normally communicating with said receptacle, a spout on said container, means for simultaneously cutting off communication between said tubular member and said receptacle and establishing communication between said tubular member and said spout, and means for pumping liquid within said container thru said tubular member and said spout.

4. In a coffee percolator, in combination, a pot, a cover for said pot, a tubular member attached to said cover, said cover and tubular member being mounted for reciprocation with respect to said pot, a spout communicating with said tubular member attached to said cover and extending to the outer side of said pot, and a piston at the lower end of said tubular member.

5. In a coffee percolator, in combination, a pot, a cover for said pot, a tubular member attached to said cover, said cover and tubular member being mounted for reciprocation on said pot, a spout attached to said cover and extending to the outer side of said pot, and a receptacle for carrying coffee grounds mounted within said pot, said tubular member normally comunicating with said receptacle and means for simultaneously cutting off communication between said tubular member and receptacle and establishing communication between said tubular member and spout.

6. In a coffee percolator, in combination, a pot, a cover for said pot, a tubular member attached to said cover, said cover and tubular member being mounted for reciprocation on said pot, a spout attached to said cover communicating with said tubular member, and extending to the outer side thereof, a piston at the lower end of said tubular member, and a spring interposed between the underside of said piston and the bottom of said pot.

7. In a coffee percolator, in combination, a pot adapted to contain liquid, a cover for said pot, mounted for reciprocation on said pot, a tubular member attached to said cover and a piston at the lower end of said tubular member.

8. In a coffee percolator, in combination, a pot, having a neck portion, adapted to contain liquid, a cover for said pot, mounted for reciprocation on said neck portion, means associated with said cover for pumping liquid from said pot, said means comprising a vertical tubular member and a disc attached to the lower end of said member.

9. In a coffee percolator, in combination, a pot having a neck portion, adapted to contain liquid, and a cover for said pot, mounted for reciprocation on said neck portion, and means associated with said cover for pumping liquid from said pot, said means comprising a vertical tubular member and a disc attached to the lower end of said member, and a spring interposed between said disc and the bottom wall of said pot.

10. In a coffee percolator, a coffee pot having a cylindrical lower end portion, an outwardly tapering wall portion extending from said cylindrical portion and means for pumping liquid from said pot, said means comprising a disc having an outer diameter substantially equal to the inner diameter of said cylindrical portion and means for reciprocating said disc within said portion.

11. A coffee percolator comprising a receptacle adapted to contain liquid, a piston mounted within said receptacle, a tubular member attached to said piston, a container for ground coffee mounted on said tubular member, a cover mounted for reciprocation on said recptacle, and a spout slidably mounted on said cover and having a portion adapted for alignment or disalignment with said tubular member.

12. A coffee percolator comprising a receptacle adapted to contain liquid, a piston mounted within said receptacle, a tubular member attached to said piston, a container for ground coffee mounted on said tubular member, a cover mounted for reciprocation on said receptacle, a spout slidably mounted on said cover and having a portion adapted for alignment or disalignment with said tubular portion, a heat insulating member mounted on the top of said cover, and a handle member attached to said spout.

13. A coffee percolator comprising a pot, percolating means within said pot, a cover mounted for reciprocation on said pot, means movable with said cover for pumping percolated coffee from said container, and means for directing steam generated within said container outwardly from said pot.

14. A coffee percolator comprising a container adapted to contain liquid, a piston mounted for reciprocation within said container, a tubular member attached to said piston communicating with the underside of said piston and with the exterior of said container, a receptacle for ground coffee mounted within said container, and having an opening receiving said tubular member, said container having a portion forming a cylinder for said piston whereby reciprocation of said tubular member and said piston will cause liquid beneath said piston to be pumped from said container.

In testimony whereof I affix my signature.

ISRAEL GROMETSTEIN.